United States Patent
Herz et al.

Patent Number: 5,593,245
Date of Patent: Jan. 14, 1997

[54] PUSH-FIT CONNECTING JOINT

[75] Inventors: Erich Herz, Singen; Heiko Habich, Rheinfelderstr, both of Germany

[73] Assignee: Alusuisse Technology & Management Ltd., Switzerland

[21] Appl. No.: 340,061

[22] Filed: Nov. 15, 1994

[30] Foreign Application Priority Data

Dec. 14, 1993 [CH] Switzerland .............. 3726/93

[51] Int. Cl.⁶ .............. F16B 7/18; B62D 27/02
[52] U.S. Cl. .............. 403/403; 403/231; 403/170; 403/267; 296/205; 296/193; 296/197; 296/30
[58] Field of Search .............. 296/29, 30, 187, 296/203, 204, 205, 209, 193, 194, 195, 196, 197, 198; 403/267, 265, 169, 170, 217, 403, 402, 231

[56] References Cited

U.S. PATENT DOCUMENTS

| | | |
|---|---|---|
| 3,788,240 | 1/1974 | Nadherny. |
| 4,462,629 | 7/1984 | Todori et al. .............. 296/203 X |
| 4,660,345 | 4/1987 | Browning .............. 296/205 X |
| 4,738,069 | 4/1988 | Williams .............. 403/402 X |
| 4,747,248 | 5/1988 | Fahs .............. 403/403 X |
| 4,932,805 | 6/1990 | Mullen et al. .............. 403/13 |
| 4,988,230 | 1/1991 | Banthia et al. .............. 403/403 X |
| 5,131,714 | 7/1992 | Evans, Sr. et al. .............. 296/205 X |
| 5,209,541 | 5/1993 | Janotik .............. 296/204 X |
| 5,287,813 | 2/1994 | Hanni et al. .............. 296/205 X |
| 5,320,403 | 6/1994 | Kazyak .............. 296/205 X |
| 5,324,133 | 6/1994 | Kreis et al. .............. 296/205 X |
| 5,425,520 | 6/1995 | Matsumoto .............. 403/231 X |

FOREIGN PATENT DOCUMENTS

| | | |
|---|---|---|
| 6467417 | 3/1989 | Japan. |
| 5-319304 | 12/1993 | Japan .............. 296/29 |
| 1148752 | 4/1969 | United Kingdom. |
| 2007324 | 5/1979 | United Kingdom. |

*Primary Examiner*—Anthony Knight
*Attorney, Agent, or Firm*—Bachman & LaPointe, P.C.

[57] ABSTRACT

Push-fit connecting joints comprising a node and at least one hollow section, where the node contains attachment parts and the attachment parts feature openings to accommodate connecting elements, and the hollow section features at least one hollow chamber and at least one opening for the connecting element. The openings in the hollow section are oversized with respect to the corresponding openings in the attachment part and the region of the opening on the outside of the hollow section is covered over by a cover sheet. The cover sheet features for each connecting element an opening having the dimensions of the opening in the attachment part, and an adhesive is provide between the cover sheet and the hollow section. The push-fit connecting joints may be employed in the construction of Space-frame parts.

20 Claims, 1 Drawing Sheet

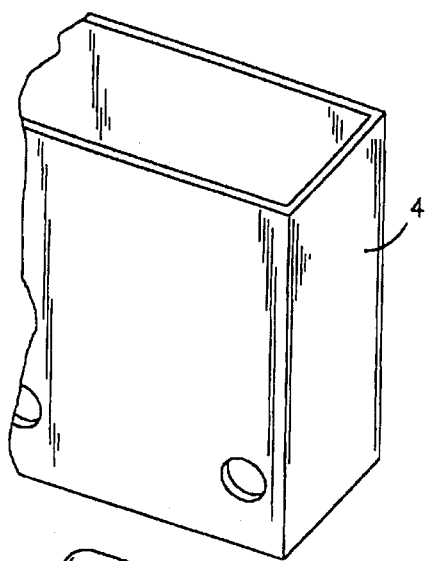
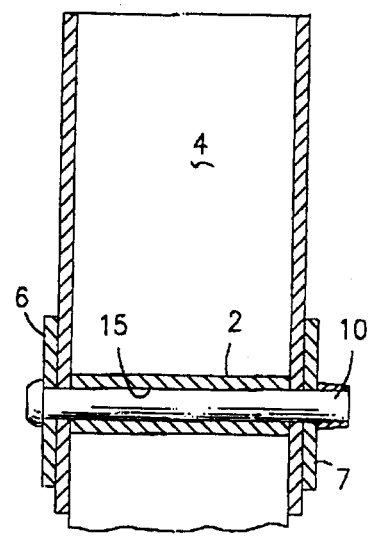
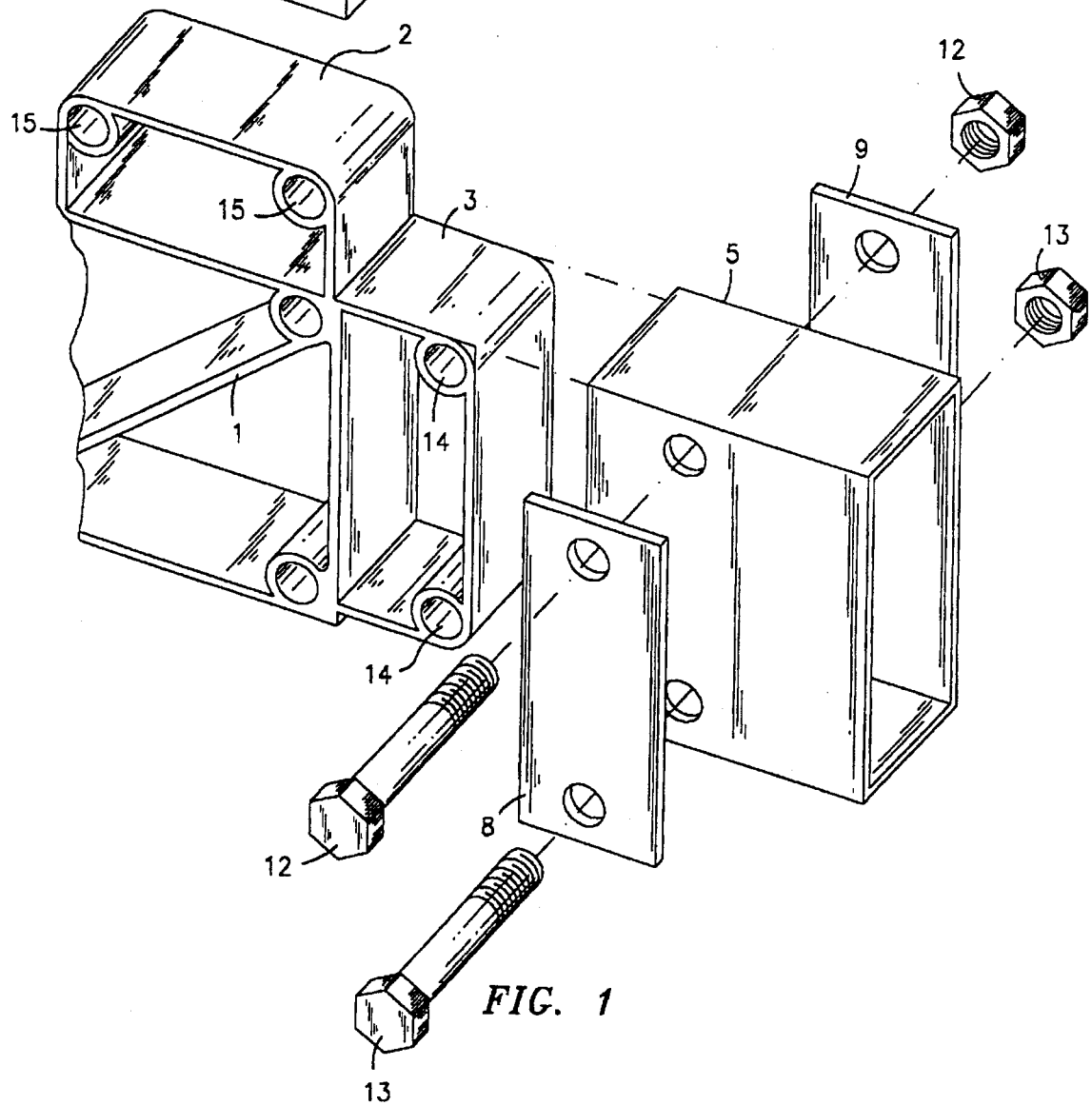
FIG. 2
FIG. 1

PUSH-FIT CONNECTING JOINT

BACKGROUND OF THE INVENTION

The present invention relates to a push-fit connecting joint comprising a node and at least one hollow section, the node featuring at least one attachment part and the attachment part at least one recess for accommodating a connecting element, the hollow section featuring at least one hollow chamber and at least one recess for the connecting element. The present invention relates also to the use of the push-fit connecting joint.

It is known to manufacture three-dimensional shapes, frame-type or lattice structures using so-called nodes and hollow sections. Such structures are for example structural components or complete frames for the passenger cabin or the front part of private cars. In the field such structures are known as "Space-Frames" and are employed mainly in vehicle manufacture, e.g. for manufacturing private cars. The so-called nodes represent connecting pieces joined to one or more sections. The sections may be for example extruded aluminum sections and may feature one or more hollow sections. The nodes may feature attachment parts to which the hollow sections may be attached using joining pins. The attachment parts of the nodes may feature holes, likewise the hollow sections and such that on pushing the hollow sections onto the attachment parts, the holes are aligned with each other. Joining elements such as e.g. bolts can be pushed into the holes in the hollow section and the holes in the attachment parts. This way the hollow sections can be permanently joined to the attachment parts.

It has been found that the attachment parts of the nodes and the hollow sections have to be manufactured with precision, in order that, when the hollow section is pushed over the attachment part, the holes in each are so well aligned that a bolt can be pushed through both sets of holes without problem. This degree of precision cannot always be readily achieved, or if so only with difficulty.

SUMMARY OF THE INVENTION

The object of the present invention is to eliminate this disadvantage and to propose a solution which enables hollow sections to be attached easily and securely to nodes in a simple manner, at the same time readily accommodating the tolerances that prevail in production.

This objective is achieved by way of the invention in that the openings in the hollow section are larger than the corresponding openings in the attachment parts and the region of the openings on the outside of the hollow section is covered with a sheet, the cover sheet for each joining element featuring an opening of the dimension of the opening in the attachment part, and an adhesive is positioned between the cover sheet and the hollow section.

BRIEF DESCRIPTION OF THE DRAWINGS

FIG. 1 shows an exemplified embodiment of a push-fit connection joint according to the present invention.

FIG. 2 shows a cross section through the assembled push-fit connection joint.

The nodes may for example be in the form of a shaped body manufactured by casting, forging or extrusion methods. The nodes may be e.g. of aluminum or its alloys and the nodes may be produced e.g. by pressure die-casting, vacuum die-casting, chill casting etc., forging or extrusion.

Each node may feature at least one attachment part, as a role two, three or four attachment parts. A hollow section may be fitted onto each attachment part, and such that the attachment part is inserted into the hollow section in question to a depth of e.g. 20 to 100 mm. Each attachment part features at least one opening running transverse to the direction of insertion. The hole in the attachment part may be an open-ended hole or a blind-end bore. Preferred are holes that penetrate the attachment part in question transversely to the direction of insertion. Usefully, an attachment part features a hole at the upper and lower limits of its outermost end. Correspondingly, the hollow section features, in the region of the connecting joint, holes that correspond to those in the attachment part.

The hollow sections are usefully of aluminum or aluminum alloys. The hollow sections may be manufactured by extrusion methods. The hollow sections usefully feature at least one hollow chamber with interior cross-section dimensions that correspond to the outer cross-section dimensions of the attachment part of the node or are very slightly larger than the latter in order that the hollow chamber can be fitted over the attachment part of the node. The hollow sections may feature further chambers or open parts and flanges. The hollow sections may be for example 20 to 250 mm in height, advantageously 30 to 150 mm, and 10 to 100 mm in breadth, advantageously 20 to 75 mm.

Permanent joining of the hollow sections and nodes is achieved by way of joining elements such as e.g. screws, bolts or rivets. Useful are bolted joints employing bolts or bolts with nuts. The bolts may be screwed into a threaded blind-end bore, or the holes penetrate the attachment parts completely and the bolt passes successively through one hollow section wall, the attachment part and the second wall of the hollow section on the opposite side. The bolts may also penetrate the hollow section and the attachment part and be secured in place by means of a nut, especially a bolt such that is rectangular in cross-section or e.g. a parallelogram shaped clamping plate situated in the hollow section. Push-fit connecting joints according to the present invention may feature undercut grooves as openings in the attachment parts, the joining elements may be bolts and nuts, especially such that the bolts are rectangular in shape or clamping plates situated in the undercut grooves. Joining elements may also be in the form of rivets such as fully penetrating rivets, so-called Huck-bolts or blind rivets. If the openings in the attachment parts are in the form of holes, then the diameter of these holes is usefully the same as or approximately the same as that of the joining element. This way it is possible to insert the joining element with good fit i.e. without play, in the holes in the attachment part. At the threaded end the bolt is as a rule secured by means of a nut; if desired a spring-type washer or the likes may be provided. The hollow sections feature openings that correspond to and come into line with the openings in the attachment part. These openings in the hollow sections are e.g. oversized holes or oblong holes. The diameter of the oversized holes is larger e.g. by 5 to 30% than that of the holes in the attachment part. Each attachment part may be joined to the hollow section e.g. by means of one or more joining element, usefully two, three or four joining elements.

The diameter of the opening in the attachment part and in the cover sheet preferably corresponds to the diameter of the joining element, as a rule with a small tolerance of fit, and the diameter of the opening in the hollow section is larger than the diameter of the joining element. Usefully, the openings are bored holes. The bored holes may e.g. be 3 to 30 mm in diameter.

Cover sheets are provided on the outside of the hollow sections in the region of the openings in the hollow section. The cover sheets feature openings that correspond in location, shape and size to those in the attachment part. The cover sheets are advantageously mounted outside in mirror image fashion on both sides of the hollow section in question. If a plurality of joining elements is to be employed to secure the hollow section to the attachment part, then one single cover sheet usefully covers the openings on one side of the hollow section. As a rule these openings are bored holes whose inner diameter corresponds to the outer diameter of the joining element i.e. the joining element can penetrate the cover sheet without any or little room for play. This way the connecting elements are mounted in the cover sheet and in the attachment part without play or essentially without play. The size of the cover sheet is usefully selected such that the openings are e.g. 3 to 50 mm from the outer edge of the cover sheet. The cover sheets may for example be of aluminum or its alloys, iron, steel, non-ferrous metals etc. The thickness may be e.g. 0.1 to 3 mm, preferably 0.3 to 2 mm.

The cover sheet is positioned on the outside of the hollow section by means of an adhesive layer. The adhesive layer may e.g. be an adhesive film or a solvent-containing or a solvent-free one or two component adhesive. The adhesives may be selected from polyurethane adhesives, styrol-butadiene adhesives, polyamide adhesives, ethyl-vinyl-acetate adhesives, polyester adhesives, adhesives from PVC with softening agents and adhesive promoting agents, caoutchoucs or polyacrylates, polychloroprene, vinylacetate, vinylchloride or vinyldichloride and their copolymers or reaction type adhesives, containing epoxides and acidic anthydrides, epoxides and polyamides, polyisocyanates and polyols or cyanoacrylates, also methacrylates, polyester resins with styrene or with acrylates etc. Adhesive films may also comprise or contain polyolefins such as e.g. polyethylenes. The adhesive may for example be employed in the form of film e.g. having a thickness of 0.8 to 1.0 mm, or the adhesive may be fluid, viscous or pasty and may be applied in amounts of e.g. 1 to 100 g/m$^2$ by brushing, wiping, rolling or spraying.

Particularly useful is a contact adhesive. The contact adhesive may be applied both to the outside of the hollow section and, particularly usefully to the inward facing side of the cover sheet, this over the whole or only part of the surface. The sheet may cover over the regions of one or more openings at the same time and may be round or polygonal, i.e. in particular rectangular.

Construction components are fitted together in a preferential manner in which the hollow section is first fitted over the attachment part in question such that the openings or the openings in the attachment part and the openings or the corresponding openings in the hollow section come into line with each other. As a rule at least two openings in the attachment part and correspondingly the four openings in a hollow section come into line with each other such that two connecting elements can be passed through the openings. Two cover sheets already pretreated with adhesive are then prepared, whereby the connecting elements e.g. bolts may already be in place through the openings in the cover sheet; the bolts are then passed through the hollow section from one side, then through the attachment part and finally through the other side of the hollow section. A second cover sheet may then be pushed over the part of the bolts that project out. If desired, washers may be pushed over the threaded parts of the bolts that project out, and nuts screwed onto the bolts. Before the nuts are finally tightened, the hollow section may be straightened to a greater or lesser degree with respect to the attachment part. On tightening the nuts, the adhesive generates its adhesive function between the cover sheet and the hollow section and bonds the cover sheet permanently to the hollow section. As a result of the strength of adhesion and the compressive force of the bolted joint, the hollow section is securely and permanently attached to the attachment part. The accuracy of size of the openings in the cover sheet and its secure attachment to the hollow section along with the accuracy of size of the openings in the attachment part ensures good interlocking by virtue of shape.

The present push-fit connecting joints concern a push-fit connecting joint with equalize tolerances.

The present invention relates also to shaped parts, supporting and non-self-supporting structural frames, lattice structures or component frames containing at least one push-fit connecting joint according to the present invention. Lattice type structures, components or frames may for example be parts of automobile bodies or automobile body frames or complete automobile body frames i.e. those of private cars or commercial vehicles or also of rail-bound vehicles. Components include for example the main frame, front frame, rear frame, parts of frame parts for a modular construction etc. The above mentioned items are employed preferably in space-frame technology.

A node (1) features as shown here two attachment parts (2,3). The nodes may for example be an extruded section. Two hollow sections (4, 5) are push-fit mounted onto the attachment parts (2, 3). Cover sheets (6, 7) and (8, 9) are mounted on each side of the hollow sections (4, 5) on the outside in the region of the connecting elements. Adhesive layers are provided between the cover sheets and the hollow sections.

Indicated by way of example are riveted joints (10, 11) i.e. so-called Huck-bolts, and bolted joints (12, 13). The rivets and bolts penetrate the extruded oblong holes (14, 15) in the nodes. The joining elements (12, 13) pass first through e.g. the cover sheet (8), then one side wall of the hollow section (5), the oblong hole (14, and 15), the other side wall of the hollow section (5) and finally the cover sheet (9). The heads of the rivets, the heads of the bolts and the nuts are braced against the cover sheets (6, 7, 8, 9). Good interlocking as a result of shape is achieved between the connecting elements, the cover sheets and the oblong holes.

We claim:

1. Push-fit connecting joint comprising a node and at least one hollow section, wherein said node and hollow section are of aluminum or aluminum alloys, said node including at least one attachment part, wherein the attachment part fits within the hollow section and the attachment part including at least one opening to accommodate at least one connecting element, and the hollow section having an outside and including at least one hollow chamber and at least one opening for the connecting element, wherein openings in the attachment part are aligned with openings in the hollow section, and wherein openings in the hollow section are oversized with respect to the corresponding openings in the attachment part to permit adjustment of the hollow section with respect to the attachment part and the hollow section openings on the outside of the hollow section are covered over by a cover sheet, the cover sheet for each connecting element including an opening of the dimensions of the opening in the attachment part, with the cover sheet opening aligned with an opening in the hollow section, and an adhesive is provided between the cover sheet and the hollow section.

2. Push-fit connecting joint according to claim 1 wherein the connecting element is a bolted or riveted joint.

3. Push-fit connecting joint according to claims 1 wherein said at least one connecting element includes bolts.

4. Push-fit connecting joint according to claim 1 wherein the diameter of the opening in the attachment part and in the cover sheet corresponds to the diameter of the connecting element and the diameter of the opening in the hollow section is larger than the diameter of the connecting element.

5. Push-fit connecting joint according to claim 4 wherein the diameter of the openings in the hollow section is 5–30% larger than the diameter of the openings in the attachment part.

6. Push-fit connecting joint according to claim 5 wherein the diameter of all of the openings is 3–30 mm.

7. Push-fit connecting joint according to claim 1 wherein the opening in the attachment part is a blind hole.

8. Push-fit connecting joint according to claim 1 wherein said hollow section is a shaped part.

9. Push-fit connecting joint according to claim 1 wherein the attachment part is fitted into the hollow section to a depth of 20–100 mm.

10. Push-fit connecting joint according to claim 1 wherein the attachment part is inserted into the hollow section, with the opening in the attachment part running transverse to the direction of insertion.

11. Push-fit connecting joint according to claim 1 wherein the attachment part includes an outermost end and upper and lower limits of said outermost end, with the attachment part at least one opening including openings at said upper and lower limits, and with hollow section openings being aligned therewith.

12. Push-fit connecting joint according to claim 1 wherein the hollow section is 20–250 mm in height and 10–100 mm in breadth.

13. Push-fit connecting Joint according to claim 1 wherein the hollow section has two sides, with openings in the hollow section extending from one side to the other side, and including two cover sheets with one on each side of the hollow section, and with openings in both cover sheets aligning with openings in the hollow section.

14. Push-fit connecting joint according to claim 1 wherein the cover sheet has an outer edge, and wherein the opening in the cover sheet is 3–50 mm from the outer edge.

15. Push-fit connecting joint according to claim 14 wherein the thickness of the cover sheet is 0.1–3 mm.

16. Push-fit connecting joint according to claim 1 wherein said hollow section is a frame structure.

17. Push-fit connecting joint according to claim 1 wherein said hollow section is a lattice structure.

18. Push-fit connecting joint according to claim 1 wherein the cover sheet is a separate element which is adhesively bonded to the hollow section.

19. Push-fit connecting joint according to claim 1 wherein the attachment part has a solid wall structure with the openings in the attachment part depending from the solid wall structure.

20. Push-fit connecting joint according to claim 19 wherein the attachment part has a generally C-shape or a box-like closed form.

* * * * *